United States Patent Office 3,172,393
Patented Mar. 9, 1965

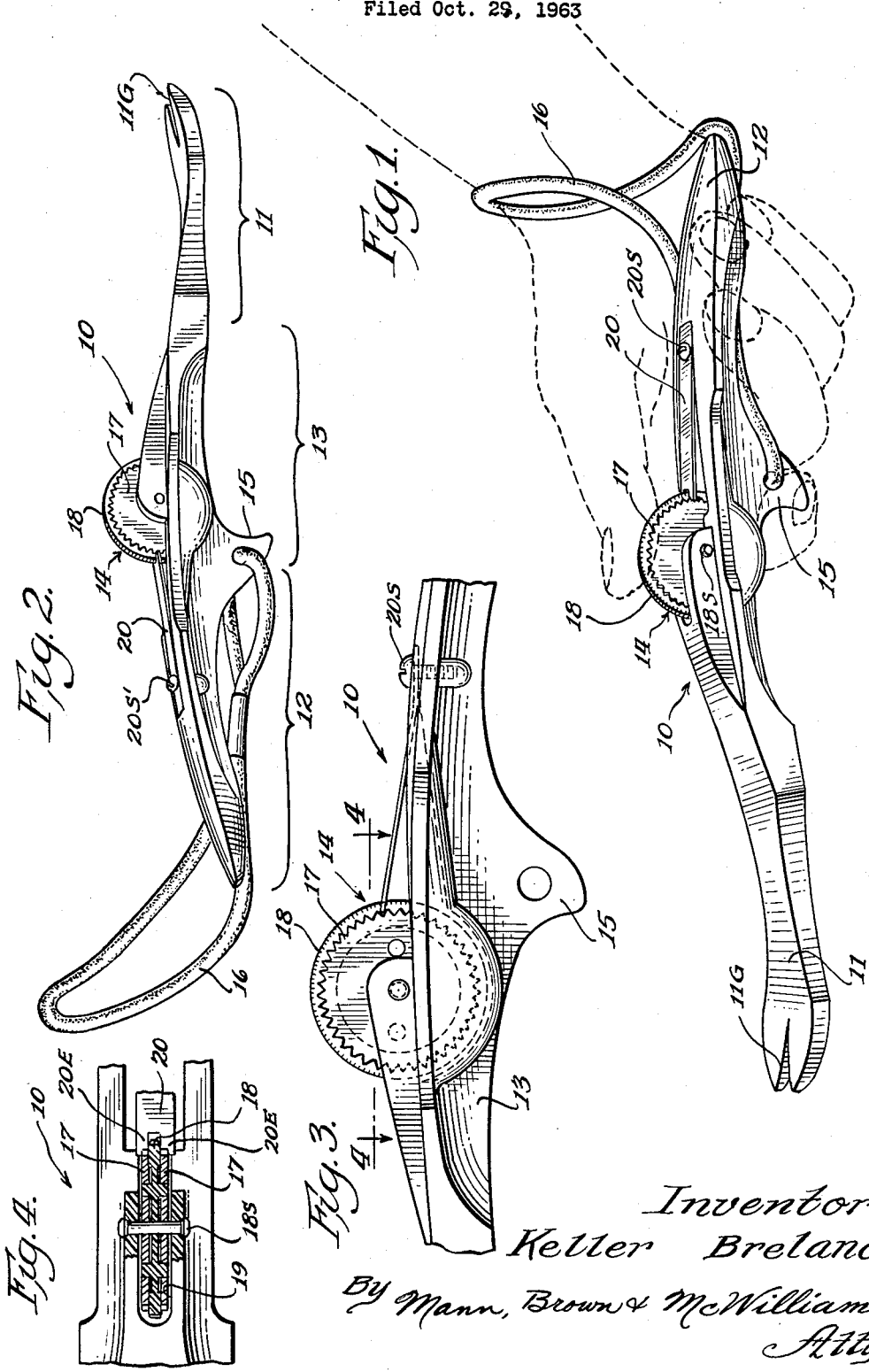

3,172,393
ANIMAL TRAINING DEVICE
Keller Breland, Hot Springs, Ark., assignor to Animal Behavior Enterprises, Inc., a corporation of Arkansas
Filed Oct. 29, 1963, Ser. No. 319,800
4 Claims. (Cl. 119—29)

This invention relates to animal training and to a device for use therein, and particularly it relates to the training of animals through a system of rewards.

One of the more successful techniques for animal training involves the use of a food reward for correct behavior, and the present invention has to do with an improvement relating to this general system of training. It has been discovered that the efficient use and application of the technique of animal training depends upon the prompt supply of the reward to the animal that is being trained, or in other words, upon the giving of the reward to the animal as quickly as possible after the animal has exhibited the desired behavior. In practice it has been found that an appreciable although relatively short time must elapse between the trainer's decision and the actual feeding of the animal and because of this the animal is often unable to clearly associate the reward with a particular element of its recent behavior.

Under the present invention, however, it has been discovered that a substantial improvement in the efficiency of animal training may be attained by giving the reward to the animal in such a way that the animal quickly learns to associate the reward with a particular element of its recent behavior, and it is the primary object of the invention to simplify and improve the reward method of training animals by shortening the time between the approved performance by the animal and the effective rewarding of the animal for each performance. Another and related object is to provide a training device that is simple in character and which will enable such prompt and almost instant reward to be provided.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a perspective view of a training device embodying the features of the invention;

FIG. 2 is a perspective view of the other side of the training device;

FIG. 3 is a fragmentary side elevational view of the center portion of the training device; and FIG. 4 is a fragmentary sectional view taken along the line 4—4 of FIG. 3.

For purposes of disclosure the invention is illustrated herein as embodied in an animal training device 10 that is particularly adapted for use in training animals such as dogs, but as the description proceeds it will become evident that the basic features of the training device 10, and the basic principles of the disclosed method of using the same may be applied to the training of other animals and types of animals. The device is shown in FIG. 1 as it is held in practice in the hand of the animal trainer. The training device 10 comprises a body that is elongated in character and comprises a forward food supporting portion 11 that is flat or spatulate in form, a rear handle portion 12 and an intermediate portion 13 in which a noise producing means 14 is disposed.

The device 10 may be made from wood, plastic or the like, and may be ribbed on its side and bottom surfaces to provide strength and facilitate grasping or holding of the handle 12. It will be noted that a downwardly projecting lug 15 is provided forwardly of the handle 12 so that this lug 15 may be engaged by the forefinger of the trainer to aid in holding and positioning the device 10 in the hand of the trainer. Further, a loop 16 of cord or the like is preferably provided that extends through the lug 15, the loop 16 being adapted to encircle the wrist of the user so that the user may release his grip on the handle 12 of the device when this is desired.

The forward portion 11 of the device constitutes the food supporting portion thereof, and it is flat or spatulate in form so that it may support a serving or portion of food that is to be used as the reward. The forward food holding portion 11 may thus be used to insert this food easily and quickly into the mouth of the animal that is being trained. As thus provided, the forward portion 11 may support a serving of the usual canned dog food, and in addition, the forward end of the portion 11 has a forwardly opening V-groove 11G therein so that solid or semi-solid food, such as pieces of meat, may be wedged into and supported in the groove 11G when this is desired.

The noise producing means 14 may take many forms, but in each instance the noise making means must be adapted for relatively easy actuation by the trainer. In the present instance the noise maker or noise making means 14 comprises a pair of toothed wheels 17 secured as by riveted plastic pins on opposite faces of a somewhat larger diameter disc 18 that has its peripheral edge roughened or knurled. The disc assembly 17–18 is mounted for rotation by a shaft 18S in a recess 19 in the body portion 13. Rearwardly of the disc assembly 17–18, a leaf spring 20 is secured to the handle 12 by a screw 20S, and the spring 20 has its forward end notched so as to embrace the edge portion of the knurled disc 18 and provide forward extensions 20E that engage the toothed edges of the respective toothed discs 17. Thus, when the knurled wheel 18 is actuated by the user's thumb, as for example in a counterclockwise direction in FIG. 1, the spring 20 is caused to snap over the successive teeth of the wheels 17 and thereby produce a vibrating action with a resulting sound which of course may be of a relatively high pitch adapted particularly to attract the attention of an animal such as a dog.

In the use of the training device 10 of this invention, the trainer, before starting the training operation, loads the forward end 11 with food. The trainer actuates the knurled wheel 18, thus producing an audible signal. When the audible signal has been produced, the trainer proceeds to feed the animal from the device 10. This process is repeated several times. It is found in practice that the animal soon learns to associate the noise that has been produced with the food reward which follows the noise, so that the animal in effect instantly has the feeling of reward upon hearing the noise.

The animal is then encouraged or directed to behave in the manner desired by the trainer. At the point in the performance or action of the animal where the trainer thinks that the animal has behaved in the desired manner, the trainer instantly actuates the knurled wheel 18 thus to produce the rewarding signal. The trainer may then feed the animal from the device 10 as quickly only as is reasonably possible. The actual feeding of the reward to the animal may be delayed for a short time. This procedure thus achieves what may be termed an "instant reward," in that the rewarding effect is actually started at the time the signal is given. It has been found that through the use of the training method thus described it is possible to reduce the time required to train an animal such as a dog for any particular purpose.

Thus it will be apparent that the present invention provides a new method for training animals such as dogs, and further it will be apparent that the invention provides a new and improved training device for such animals.

Thus while a preferred embodiment of the invention has been illustrated herein, it is to be understood that changes and variations may be made by those skilled in the art without departing from the spirit and scope of the appended claims.

I claim:

1. An animal training and feeding device comprising a body portion having at one end thereof a relatively flat portion for supporting a serving of food and capable of being inserted into the mouth of the animal being trained, the other end of the body portion having a hand grip, and a noise making device mounted on the body in position for operation by one or more fingers of the hand which holds the hand grip portion of the body.

2. An animal training and feeding device comprising a body portion having one end thereof shaped for supporting a serving of food and capable of being inserted into the mouth of the animal being trained, the other end of the body portion having a hand grip, and a noise making device mounted on the body in position for operation by one or more fingers of the hand which holds the hand grip portion of the body.

3. An animal training and feeding device comprising an elongated body having a spatulate forward end for carrying a serving of food to be given to an animal as a reward, the other end of the body having a hand grip, and noise making means carried on said body including an operating element positioned for operation by one or more fingers of the hand which holds the hand grip of the body.

4. An animal training and feeding device according to claim 3 in which said spatulate forward end has a V-shaped notch therein in which a chunk of food such as meat may be wedged and held.

References Cited by the Examiner
UNITED STATES PATENTS

| 1,192,487 | 7/16 | Zok | 119—51 |
| 1,265,718 | 5/18 | Ahern | 46—192 |
| 2,564,942 | 8/51 | Wemmer | 46—192 |

SAMUEL KOREN, *Primary Examiner.*

HUGH R. CHAMBLEE, *Examiner.*